United States Patent [19]

McKay

[11] Patent Number: 4,457,693
[45] Date of Patent: Jul. 3, 1984

[54] COMBUSTION PROCESS

[75] Inventor: Dwight L. McKay, Bartlesville, Okla.

[73] Assignee: Phillips Petroleum Company, Bartlesville, Okla.

[21] Appl. No.: 371,369

[22] Filed: Apr. 23, 1982

Related U.S. Application Data

[63] Continuation-in-part of Ser. No. 117,927, Feb. 4, 1980, Pat. No. 4,335,021.

[51] Int. Cl.³ .......................... F23Q 3/00; B01J 29/06
[52] U.S. Cl. ........................................ 431/2; 431/268;
208/120; 502/65; 502/241; 502/324
[58] Field of Search ...................... 431/2, 5, 7, 10, 268,
431/326; 252/471, 417; 423/239, 247, 244 R;
208/120; 252/455 R, 416, 455 Z, 456

[56] References Cited

U.S. PATENT DOCUMENTS

| 4,033,861 | 7/1977 | Holloway et al. | 208/211 |
| 4,036,740 | 7/1977 | Readal et al. | 208/120 |
| 4,133,644 | 1/1979 | Holloway et al. | 422/138 |
| 4,146,463 | 3/1979 | Radford et al. | 208/120 |
| 4,280,898 | 7/1981 | Tatterson et al. | 208/120 X |

Primary Examiner—Samuel Scott
Assistant Examiner—Randall L. Green

[57] ABSTRACT

A combustion catalyst containing both manganese and antimony in a temperature range of above about 1260° F. has been found to result in unexpectedly high $CO_2/CO$ ratios in the regenerator off-gas when CO is combusted.

14 Claims, 6 Drawing Figures

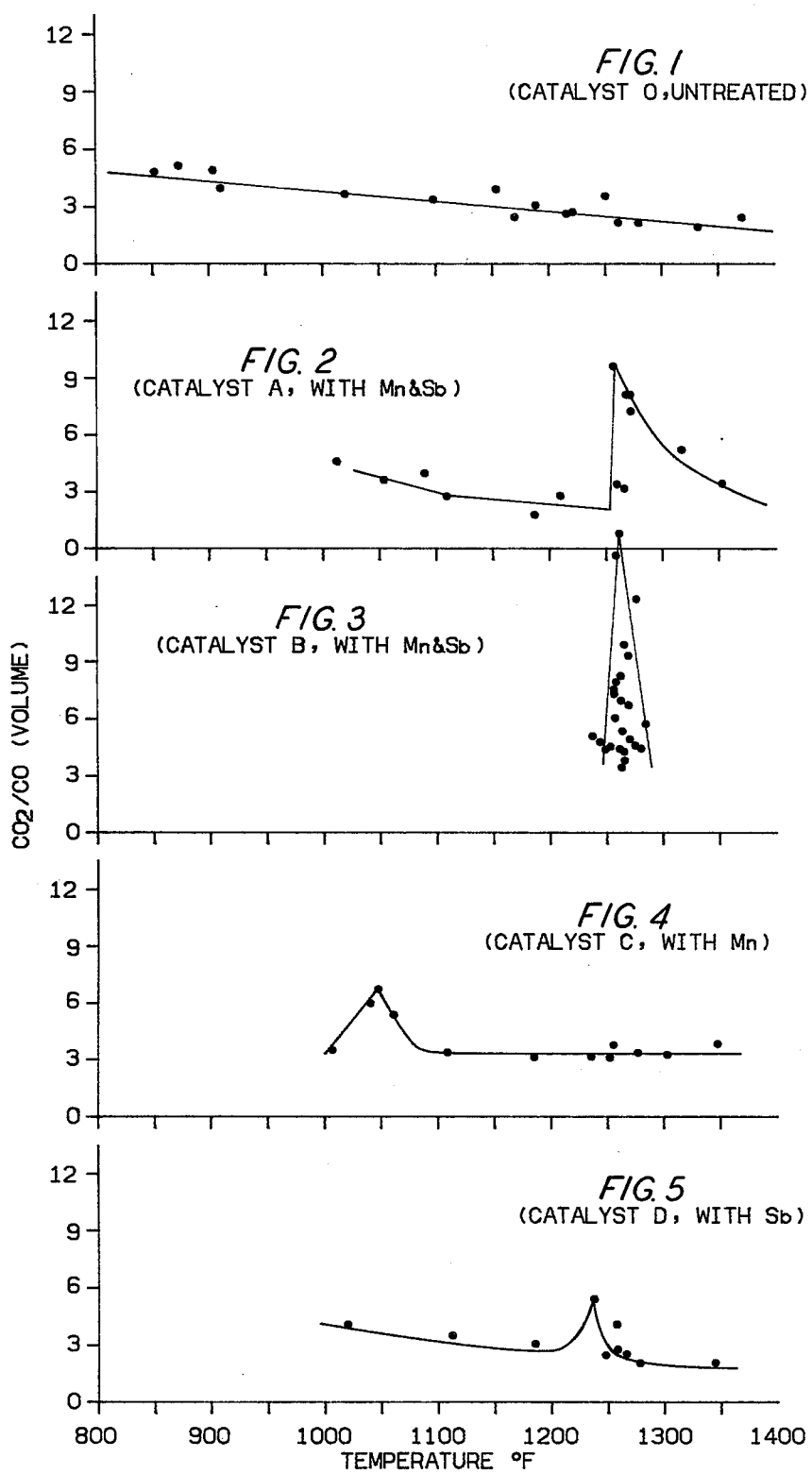

COMBUSTION PROCESS

This application is a continuation-in-part of application Ser. No. 117,927, filed Feb. 4, 1980, now U.S. Pat. No. 4,335,021.

This invention relates to a combustion process. In another aspect, this invention relates to the regeneration of catalyst that are useful for cracking hydrocarbons. In another aspect, this invention relates to a hydrocarbon cracking process.

BACKGROUND

It is well known in the art that cracking of hydrocarbons with silica or silica/alumina base catalysts produces coke on such catalysts which can be burned off. One of the problems arising in the cracking step consists in the detrimental effects brought about by such metals as nickel, vanadium, and iron contained in many hydrocarbon feedstocks. These metals cause production of hydrogen and coke. A problem arising in the catalyst regeneration step resides in the fact that the ratio of carbon dioxide to carbon monoxide normally decreases with increasing temperature. Therefore, although high temperatures are a desirable process parameter, it is not feasible to increase the temperature since this would lead to a further decrease in an already low carbon dioxide to carbon monoxide ratio in the off gases.

It has been claimed in the art that antimony, bismuth and manganese added to a cracking catalyst increased the carbon dioxide to carbon monoxide ratio. The art gives examples utilizing antimony and bismuth. There is a continuing interest in increasing the $CO_2/CO$ volume ratio in a catalyst regeneration step.

STATEMENT OF THE INVENTION

It is thus one object of this invention to provide a process for combusting carbonaceous materials on catalyst particles with a high carbon dioxide to carbon monoxide ratio.

Another object of this invention is to provide a cracking process including a catalyst regeneration step in which process both the detrimental effects of metals such as nickel, vanadium, and iron are mitigated and the $CO_2/CO$ ratio of the regeneration off gases is maximized.

A yet further object of this invention is to provide a combustion process in which a carbonaceous fuel and free oxygen are subjected to combustion conditions and a off-gas having a high $CO_2/CO$ ratio is produced.

These and other objects, advantages, details, and features of this invention will become apparent to those skilled in the art from the following detailed description thereof and the appended claims.

BRIEF DESCRIPTION OF THE DRAWINGS

FIGS. 1-5 show a graphic representation of regeneration data with the carbon dioxide to carbon monoxide volume ratio plotted versus the temperature in °F.

Figure 6:
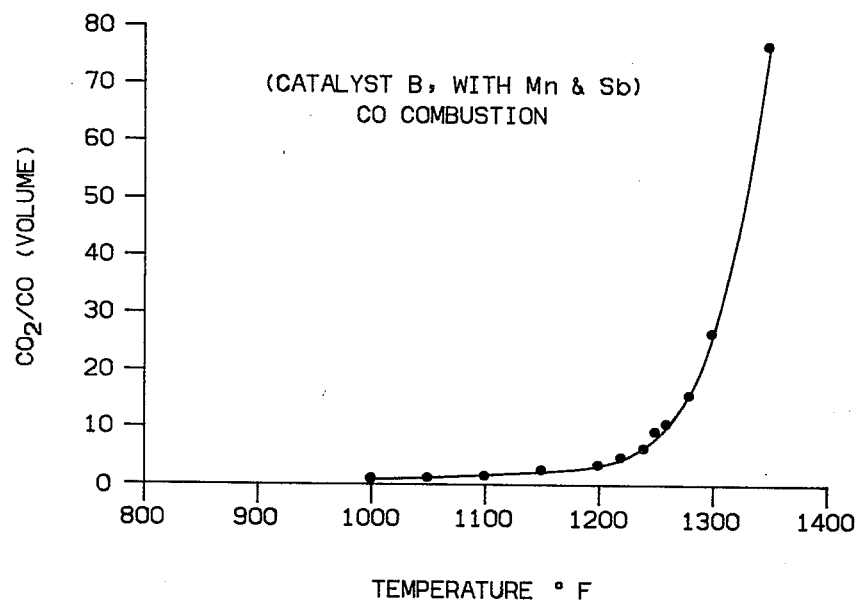
FIG. 6 shows a graphic representation of a combustion process with the carbon dioxide to carbon monoxide volume plotted versus the temperature in °F.

In accordance with this invention it has now been found that carbonaceous material accumulated on cracking catalyst can be burned off with a very high $CO_2/CO$ volume ratio in the produced gases if the catalyst contains both antimony and manganese and if the combustion is carried out in a very limited temperature range of 1260°-1280° F.

In addition, it has been discovered in accordance with this invention that a catalyst containing both antimony and manganese catalyzes a combustion process in which carbonaceous fuel and free oxygen are passed in contact with such a catalyst under combustion conditions to produce an off-gas with high $CO_2/CO$ ratio.

Thus, in accordance with one embodiment of this invention a process for combustion of carbonaceous material is provided for.

In accordance with another embodiment of this invention a cracking process is provided for in which a hydrocarbon feedstock is cracked in a cracking zone with a cracking catalyst containing manganese and antimony; the cracking catalyst containing manganese and antimony is then subjected to a regeneration by contacting it with a free oxygen containing gas at a temperature of 1260°-1280° F.; thereafter the regenerated cracking catalyst is again utilized for the cracking step.

It has surprisingly been found that manganese and antimony together result in a synergistic improvement and increase of $CO_2/CO$ ratio of the regenerator off-gas when these metals are present on a catalyst in a cracking/regeneration cycle. Manganese and antimony are passivating agents for the contaminating metals such as nickel, vanadium and iron causing a reduction of hydrogen and coke produced during the cracking process and also have the additional function of strongly increasing the $CO_2/CO$ ratio as described. Antimony or a compound thereof and manganese or a compound thereof together in addition to their metals passivation effect cause an increase in the carbon combustion from catalyst during the regeneration thus releasing more heat in the regenerator. At the same time, the quantity of carbon monoxide released is reduced. The latter is of particular significance where a portion or all of the regenerator off-gases are released to the atmosphere.

A second embodiment of this invention resides in a combustion process. This combustion process in accordance with this invention is characterized by subjecting carbonaceous fuel and free oxygen in contact with catalyst containing both manganese and antimony to combustion conditions. The carbonaceous fuel is separate from and not adhering to the catalyst. The fuel and oxygen forming a combustible mixture are passed in fluid contact with the catalyst under combustion conditions to yield the off-gas with the high $CO_2/CO$ ratio.

Fuels

The fuels useful for the combustion process of this invention are gaseous, normally liquid or normally solid carbonaceous materials. The gaseous carbonaceous materials include such gases as carbon monoxide, methane, propane or mixtures thereof. The preferred gaseous fuel is carbon monoxide in view of the discovery that carbon monoxide and free oxygen in contact with the catalyst defined above is converted to a gas having a high $CO_2/CO$ ratio. Liquid carbonaceous fuels useful in accordance with this invention include paraffinic, olefinic or aromatic liquid fuels and oils such as kerosene, gasoline, fuel oils, etc. Among the solid carbonaceous material useful as fuel in accordance with this invention graphite, tar sand, coal, char, oil shale, wood, soot, combustion byproducts, etc. should be mentioned. When solid carbonaceous materials are used in the process of this invention these fuels are utilized in finely divided form and the catalyst is used in particulate form also. In a variation of this process it is within the scope of this invention to first combust the fuel and free oxygen to form an off-gas and subject this off-gas which still contains CO and free oxygen to a further combustion step in contact with the manganese and antimony containing catalyst to yield a secondary off-gas which has the high $CO_2/CO$ ratio. In this variation of the process, which is particularly applicable to solid fuels, ashes can be separated between the two combustion steps thus minimizing the quantity of ash materials and solid particles actually contacting the catalyst.

In view of the ability to convert CO to $CO_2$ this invention is particularly applicable to carbon monoxide as a fuel. Thus, this invention is intended to encompass a combustion process in which exhaust gases from other combustion steps such as off-gases from regenerators in cracker-regenerator-loops and off-gases from internal combustion engines as well as off-gases from burners (e.g. in steam generators), are subjected to a further combustion step in the presence of free oxygen to yield a further off-gas which is very high in carbon dioxide content as compared to its carbon monoxide content.

Combustion Conditions

The combustion process in accordance with this invention will generally be carried out at a temperature above 1200° F., particularly above 1260° F. and most preferably above 1280° F. It has been found that at a temperature of 1400°–1450° F. the $CO_2/CO$ ratio has become very large, or in other words, that essentially no CO was detected in the off-gases.

The combustion process is carried out at a pressure which is selected to achieve a specific result and is frequently determined by other parameters of the combustion process involved. Preferably the operating pressure is near atmospheric pressure.

The combustion is generally carried out in a reactor or housing constructed from or lined with refractory material.

The catalyst used in accordance with this invention will be described in some more detail below. This catalyst can be used in the combustion process of this invention in various ways such as fluid bed fixed bed, geometrical structures such as honeycomb arrangements, etc. The catalyst can be continuously or intermittently subjected to regeneration. All of these arrangements and operations are broadly known in processes involving catalytic reactions and a further detailed description thereof can thus be avoided.

Feedstocks

Hydrocarbon feedstocks to the catalytic cracking process of this invention encompass all the oils usually contemplated for catalytic cracking process. The initial boiling point of the hydrocarbon feedstocks envisaged generally is above 204° C. Examples of such feedstocks include gas oils, fuel oils, cycle oils, slurry oils, topped crudes, shale oils, oils from tar sands, oils from coal or coal liquefaction, and mixtures of such oils. The hydrocarbon feedstocks contemplated for this invention are those containing significant concentrations of contaminating metals such as vanadium, iron and nickel. Since these contaminating metals tend to concentrate in the least volatile fractions of these feedstocks, cracking of heavy oils is one of the most difficult procedures in the art of hydrocarbon cracking and one of the most important applications of this invention.

The concentration of manganese and antimony on the cracking catalyst can be related to the total effective metals content of the feedstock as shown in the following table.

| Total Effective Metals in Feedstock (ppm)* | Mn + Sb Concentration in Catalyst, Wt. %** |
|---|---|
| 1–40 | 0.01–0.6 |
| 40–100 | 0.05–0.8 |
| 100–200 | 0.1–1 |
| 200–300 | 0.15–1.5 |
| 300–800 | 0.2–2 |

*"Total effective metals" is the sum of the concentration of vanadium and iron plus four times the concentration of nickel and copper.
**Based on the weight of catalyst prior to addition of manganese and antimony.

Cracking Catalysts

Cracking catalysts are compositions useful for cracking hydrocarbons in the absence of added hydrogen. They are used to convert the hydrocarbon feedstocks having a normal boiling point above 204° C. to more volatile compounds, e.g., gasoline and light distillates. Generally they contain silica or silica/alumina, frequently in association with zeolitic materials. These zeolitic materials can be naturally occurring or synthetic, and they usually are subjected to ion exchange treatment to improve the activity of the catalyst in which they are incorporated, by replacing at least part of the original alkali metal or alkaline earth cations with rare earth element cations and hydrogen ions, or with ions capable of conversion to hydrogen ions.

Unused cracking catalyst contains essentially no vanadium, iron, and nickel. Their concentrations in unused catalyst will not exceed 0.06 weight percent vanadium, 0.8 weight percent iron, and 0.02 weight percent nickel. These concentrations refer to the total weight of the unused catalyst, but excluding added manganese and antimony treating agents.

Treating Agents

Manganese that is used to treat the contaminated catalyst can be added as the elemental metal, or it can be applied as a compound of manganese. Suitable compounds include manganese oxides, such as manganese monoxide MnO, manganese sesquioxide $Mn_2O_3$, manganous-ic oxide $Mn_3O_4$, and manganese dioxide $MnO_2$, manganese sulfides such as manganous sulfide MnS and manganic sulfide $MnS_2$, salts of carboxylic acids such as manganese acetate $Mn(C_2H_3O_2)_2$, and manganese oxalate $MnC_2O_4$, salts of mineral acids such as manganese nitrate $Mn(NO_3)_2$, manganese sulfate $MnSO_4$ and $Mn_2(SO_4)_3$, and manganese halides such as manganese fluorides and manganese chlorides, and manganese phosphates such as manganese orthophosphate $Mn_3(PO_4)_2$ and manganese ammonium phosphate $Mn(NH_4)PO_4$.

The second necessary ingredient in this invention in addition to manganese is antimony. Elemental antimony, inorganic antimony compounds and organic antimony compounds or mixtures of such antimony sources can be utilized.

Examples of some inorganic antimony compounds which can be used include antimony oxides such as antimony trioxide, antimony tetroxide, and antimony pentoxide; antimony sulfides such as antimony trisulfide and antimony pentasulfide; antimony selenides such as antimony triselenide; antimony tellurides such as antimony tritelluride; antimony sulfates such as antimony trisulfate; antimonic acids such as metaantimonic acid, orthoantimonic acid and pyroantimonic acid; antimony halides such as antimony trifluoride, antimony trichloride, antimony tribromide, antimony triiodide, antimony pentafluoride and antimony pentachloride; antimonyl halides such as antimonyl chloride and antimonyl trichloride; antimonides such as indium antimonide; and the like. Of the inorganic antimony compounds, those which do not contain halogen are preferred. Although organic antimony compounds for use in the preparation of the antimony/manganese-containing catalysts preferably contain about 3 to about 54 carbon atoms for reasons of economics and availability, organic antimony compounds outside this range are also applicable. Thus, organic polymers containing antimony can be employed as the organic antimony compound. In addition to carbon and hydrogen, the organic antimony compound can contain elements such as oxygen, sulfur, nitrogen, phosphorus or the like. Examples of some organic antimony compounds which can be used in the preparation of the antimony/manganese-containing catalysts include antimony carboxylates such as antimony triformate, antimony trioctoate, antimony triacetate, antimony tridodecanoate, antimony trioctadecanoate, antimony tribenzoate, and antimony tris(cyclohexanecarboxylate); antimony thiocarboxylates such as antimony tris(thioacetate), antimony tris(dithioacetate) and antimony tris(dithiopentanoate); antimony thiocarbonates such as antimony tris(O-propyl dithiocarbonate), antimony carbonates such as antimony tris(ethyl carbonate); trihydrocarbylantimony compounds such as triphenylantimony; trihydrocarbylantimony oxides such as triphenylantimony oxide; antimony salts of phenolic compounds such as antimony triphenoxide; antimony salts of thiophenolic compounds such as antimony tris(thiophenoxide); antimony sulfonates such as antimony tris(benzenesulfonate) and antimony tris(p-toluenesulfonate); antimony carbamates such as antimony tris(diethylcarbamate); antimony thiocarbamates such as antimony tris(dipropyldithiocarbamate), antimony tris(phenyldithiocarbamate) and antimony tris(butylthiocarbamate); antimony phosphites such as antimony tris(diphenylphosphite); antimony phosphates such as antimony tris(dipropyl phosphate); antimony thiophosphates such as antimony tris(O,O-dipropyl thiophosphate) and antimony tris(O,O-dipropyl dithiophosphate) and the like. The last compound is also known as antimony tris(O,O-dipropyl phosphorodithioate), and is the presently preferred source of antimony, due in part to its solubility in hydrocarbons and its commercial availability. Mixtures of any two or more applicable substances comprising antimony can be employed.

The cracking catalyst of this invention can be one that during the cracking process has become contaminated with metals such as vanadium, iron and/or nickel and thereafter has been provided with manganese and antimony or respectively compounds of those metals to at least partially passivate the detrimental metal. It is, however, also within the scope of this invention that the combination of manganese and antimony or compounds thereof are already present on the unused cracking catalyst. The combination of antimony and manganese on the cracking catalyst causes a passivation of the metals or respectively prevents at least some of the detrimental effects of metals such as vanadium, nickel, and iron otherwise occurring. Furthermore, the combination of the two metals, manganese and antimony results in the surprising effect of very significantly increasing the $CO_2/CO$ ratio in the off-gases of the catalyst regenerator.

The cracking catalyst of this invention contains generally about 0.01 to 8 weight percent, preferably about 0.02 to 2 weight percent of manganese and about 0.01 to 8 weight percent, preferably about 0.02 to 2 weight percent of antimony. These concentrations are expressed as the elemental metal and are based on the weight of the total catalyst after treating, i.e. on the weight of the catalyst and the added metals as 100 percent. The weight ratio of manganese to antimony utilized on the catalyst of this invention generally is in the range of 10:1 to 1:10, preferably in the range of 2:1 to 1:2.

A variety of methods may be used to apply the manganese and antimony treating agents to the catalyst. They may be added to the cracking catalyst as finely divided solids and dispersed by rolling, shaking, stirring, etc. Another possibility is to dissolve the Mn and Sb source materials in a suitable solvent, aqueous or organic, and to use the resulting solution to impregnate the cracking catalyst followed by removal of the solvent. Alternatively the Mn and Sb source may be dissolved or dispersed in the hydrocarbon feedstock to the cracking process where the manganese and antimony are deposited on and retained by the catalyst.

Although the catalyst has been referred to in the above description as a "cracking catalyst" the definitions and specific embodiments of these catalysts are equally applicable to the catalyst used in the combustion process embodiment of this invention. Thus, the preferred catalyst for the combustion process is a silica or silica/alumina based catalyst containing both manganese and antimony. The preferred ranges for manganese and antimony are in the ranges described above in connection with the cracking catalyst.

Process Conditions

In the process of this invention catalytic cracking of feedstocks is effected either in a fixed catalyst bed or with a fluidized catalyst operation. The latter is preferred. Specific conditions in the cracking zone and the regeneration zone of a fluid catalytic cracker depend upon the feedstock used, the condition of the catalyst, and the product sought. In general conditions in the cracking zone include:
Temperature: 427°–649° C. (800°–1200° F.)
Time: 1–40 seconds
Pressure: 10 kPa to 21 MPa (0.1 to 205 atm.)
Catalyst/oil ratio: 3/1 to 30/1, by wt.
Conditions in the regeneration zone generally include:
Temperature: 1260°–1280° F.
Time: 2–40 minutes
Pressure: 10 kPa to 21 Mpa (0.1 to 205 atm.)
Air rate (at 16° C., one atm.):
100–250 ft.$^3$/lb. coke, or
6.2–15.6 m$^3$/kg coke The following examples are intended to illustrate the invention and describe further preferred features without undue limitation of the invention.

EXAMPLE I

A commercial fluid cracking catalyst comprising amorphous silica/alumina and rare earth cation-exchanged zeolite, which had been used in a commercial fluid catalytic cracker until it had attained equilibrium composition with respect to metals accumulation (catalyst was being removed from the process system at a constant rate) was used to demonstrate the effect of being treated with both manganese and antimony. Table I summarizes the composition as determined by analysis, and some pertinent physical properties of this catalyst, designated catalyst 0.

TABLE I

| Surface area, m²/g | 74.3 |
|---|---|
| Pore vol., ml/g | 0.29 |
| Composition, wt. % | |
| Aluminum | 21.7 |
| Silicon | 24.6 |
| Sodium | 0.39 |
| Vanadium | 0.60 |
| Iron | 0.90 |
| Nickel | 0.38 |
| Cerium | 0.40 |
| Carbon | 0.06 |

Portions of catalyst 0 were used to prepare four catalysts containing manganese and/or antimony as follows.

Catalyst A was prepared by adding 0.4434 g of powdered MnS and 0.6114 g of powdered $Sb_2(SO_4)_3$ to 35.0 g of dry catalyst 0 in a tubular quartz reactor. These components were mixed by fluidization for 10 minutes at room temperature with nitrogen, then heated to 482° C. while fluidization with nitrogen continued. Nitrogen was replaced with hydrogen and the temperature was increased to 649° C. Nitrogen replaced hydrogen and the catalyst was fluidized for five minutes at temperature to purge the reactor after which the catalyst was fluidized with air for 15 minutes at that temperature. Catalyst A contained 0.79 weight percent of both manganese and antimony by calculation.

Catalyst B was prepared by adding 0.3991 g of powdered MnS and 0.5503 g of $Sb_2(SO_4)_3$ to 36 g of catalyst 0. The components were mixed and conditioned during fluidization just as described for catalyst A. Catalyst B contained 0.69 weight percent of both manganese and antimony by calculation.

Catalyst C was prepared by adding 0.4434 g of powdered MnS to 35 g of catalyst 0. The components were mixed and conditioned during fluidization just as described for catalyst A. Catalyst C contained 0.79 weight percent of manganese by calculation.

Catalyst D was prepared by adding 0.624 g of $Sb_2(SO_4)_3$ to 35 g of catalyst 0. The components were mixed and conditioned during fluidization just as described for catalyst A. Catalyst D contained 0.79 weight percent of antimony by calculation.

Catalyst 0 and A were evaluated to crack a West Texas topped crude oil. Prior to that run catalyst A was aged by being subjected to ten cycles of the following treatment after receiving the conditioning already described. The catalyst at about 482° C. was fluidized with nitrogen for one minute, then heated to about 510° C. during two minutes while fluidized with hydrogen, then maintained at 510° C. for one minute while fluidized with nitrogen, then heated to about 649° C. for 10 minutes while fluidized with air, and then cooled to about 482° C. during 0.5 minutes while fluidized with air. After 10 such cycles it was cooled to room temperature while being fluidized with nitrogen and was tested. Catalysts 0 and A were tested in fluidized bed reactors at 510° C. and atmospheric pressure using 0.5 minute cracking periods with intervening regeneration periods at about 649° C.

Pertinent properties of the topped West Texas crude oil used in these runs are tabulated in U.S. Pat. No. 4,111,845, at column 8.

A series of runs was made in which the catalyst/oil ratio was varied to obtain the desired range of conversions. Gas and liquid products were analyzed by GLC and the reactor was weighed to determine coke. A smooth curve was obtained from the data points and results at 75 volume percent conversion of the feed are presented in Table III.

TABLE III

| Catalyst | Cat./Oil Wt. Ratio | Coke, Wt. % of Feed | Scf $H_2$/bbl Feed Converted | Gasoline, Vol. % of Feed |
|---|---|---|---|---|
| 0 | 7.4 | 16.4 | 800 | 54.8 |
| A | 6.15 | 12.6 | 360 | 59.0 |

The presence of 0.79 wt. % each of manganese and antimony on the used cracking catalyst decreased the coke produced by 23%, decreased by hydrogen produced by 55%, and increased the yield of gasoline by 7.7%.

EXAMPLE II

Catalyst 0, A, B, C, and D all were used separately to crack the topped crude in exactly the manner described in Example I, 0.5 minutes at 510° C. and atmospheric pressure. After addition of the oil had ceased, fluidization of the catalyst with nitrogen continued for 10 minutes to strip hydrocarbons from the reactor. Coked catalysts were regenerated with air and the $CO_2/CO$ ratio in the off-gas was determined by measuring their concentrations by GLC. Portions of the off-gas were collected by water displacement in receivers large enough to contain the off-gas produced in several minutes. Regeneration was generally complete within 40 minutes, and, when it was desired, several samples of off-gas were obtained during a single regeneration. These samples were always collected during the first 20 minutes of oxidation; the concentration of carbon oxides in the regeneration off-gas was constant during that part of the process. A thermocouple in the bed of fluidized catalyst being regenerated indicated its temperature which changed with time because of the heat liberated during regeneration. In some runs the air for regeneration was saturated with water vapor at about 24° C. before being introduced into the reactor; in other runs the air was not humidified. This difference in treatment is not believed to have affected the $CO_2/CO$ ratio in the off-gas. Table IV summarizes pertinent conditions and results from regeneration of coked catalysts 0, A, B, C, and D as described. These data have also been plotted to show the relation between $CO_2/CO$ mole ratio and the regeneration temperature in FIGS. 1-5.

The figures show that the $CO_2/CO$ ratio from regenerating untreated catalyst 0 declines monotonically from about 5 to about 2 as the temperature of regeneration increases from about 850° to about 1350° F. In contrast catalysts A and B, both of which contain manganese and antimony in equal concentrations, show unexpected activity to oxidize carbon more completely in the temperature range of about 1260° to 1280° F. Data from catalyst A were obtained in runs that span a large fraction of the temperature range generally used to regenerate FCC catalyst. Catalyst B, prepared subsequently, was used in runs to define in detail the temperature range disclosed by catalyst A. Regeneration off-gas from it showed essentially identical $CO_2/CO$ ratios versus regeneration temperature, and confirm that the particularly effective temperature range is about 1260°–1280° F.

Catalyst C, treated with manganese only, and which is not a part of this invention, suggests that at about 1050° F. it is particularly effective for carbon oxidation to carbon dioxide. Catalyst D, treated with antimony only, in two runs showed anomalously high $CO_2/CO$ ratios at about 1250° F., but the ratio is substantially smaller than that obtained when antimony was combined with manganese at about the same temperature.

TABLE IV

| Catalyst | Run | Air Humidified | Regeneration Temp., °F. | Mole Ratio $CO_2/CO$ |
|---|---|---|---|---|
| 0 | 1 | Yes | 1225 | 2.83 |
| 0 |   | Yes | 1219 | 2.74 |
| 0 | 2 | No | 1218 | 2.81 |
| 0 |   | No | 1190 | 3.09 |
| 0 | 3 | Yes | 1378 | 2.61 |
| 0 |   | Yes | 1100 | 3.47 |
| 0 |   | Yes | 1022 | 3.83 |
| 0 | 4 | Yes | 1253 | 3.61 |
| 0 |   | Yes | 1265 | 2.29 |
| 0 |   | Yes | 1281 | 2.21 |
| 0 | 5 | Yes | 1155 | 4.05 |
| 0 |   | Yes | 1173 | 2.62 |
| 0 |   | Yes | 1335 | 2.07 |
| 0 | 6 | Yes | 852 | 5.14 |
| 0 |   | Yes | 875 | 5.31 |
| 0 |   | Yes | 905 | 4.93 |
| 0 |   | Yes | 912 | 4.13 |
| A | 7* | Yes | 1260 | 9.65 |
| A | 8 | Yes | 1012 | 4.67 |
| A |   | Yes | 1110 | 2.85 |
| A |   | Yes | 1356 | 3.57 |
| A | 9 | Yes | 1092 | 4.10 |
| A |   | Yes | 1275 | 8.13 |
| A |   | Yes | 1275 | 7.33 |
| A |   | Yes | 1180 | 3.36 |
| A | 10 | Yes | 1320 | 5.31 |
| A |   | Yes | 1212 | 2.92 |
| A |   | Yes | 1055 | 3.62 |
| A | 11 | Yes | 1272 | 8.31 |
| A |   | Yes | 1262 | 3.44 |
| A |   | Yes | 1266 | 3.19 |
| B | 12 | No | 1268 | 9.92 |
| B |   | No | 1266 | 5.37 |
| B |   | No | 1264 | 4.48 |
| B | 13 | No | 1263 | 8.22 |
| B |   | No | 1255 | 4.55 |
| B |   | No | 1250 | 4.46 |
| B | 14 | No | 1260 | 7.08 |
| B |   | No | 1266 | 4.33 |
| B | 15 | No | 1271 | 6.83 |
| B |   | No | 1277 | 4.53 |
| B |   | No | 1283 | 4.49 |
| B |   | No | 1287 | 5.69 |
| B | 16 | No | 1257 | 7.49 |
| B |   | No | 1253 | 4.58 |
| B |   | No | 1247 | 4.81 |
| B |   | No | 1239 | 5.11 |
| B | 17 | No | 1268 | 3.88 |
| B | 18 | Yes | 1262 | 7.17 |
| B |   | Yes | 1264 | 3.54 |
| B | 19 | No | 1263 | 7.04 |
| B |   | No | 1265 | 15.93 |
| B | 20 | No | 1271 | 5.21 |
| B |   | No | 1272 | 9.34 |
| B |   | No | 1279 | 12.34 |
| B | 21 | No | 1258 | 6.03 |
| B |   | No | 1260 | 7.98 |
| B |   | No | 1260 | 14.81 |
| C | 22* | Yes | 1257 | 3.83 |
| C |   | Yes | 1186 | 3.17 |
| C |   | Yes | 1006 | 3.52 |
| C | 23 | Yes | 1060 | 5.39 |
| C |   | Yes | 1237 | 3.18 |
| C |   | Yes | 1350 | 3.87 |
| C |   | Yes | 1108 | 3.31 |

TABLE IV-continued

| Catalyst | Run | Air Humidified | Regeneration Temp., °F. | Mole Ratio $CO_2/CO$ |
|---|---|---|---|---|
| C | 24 | Yes | 1042 | 5.97 |
| C |   | Yes | 1253 | 3.05 |
| C | 25 | Yes | 1046 | 6.75 |
| C |   | Yes | 1278 | 3.39 |
| C |   | Yes | 1305 | 3.31 |
| D | 26 | Yes | 1239 | 5.41 |
| D |   | Yes | 1187 | 3.01 |
| D |   | Yes | 1113 | 3.51 |
| D |   | Yes | 1018 | 4.02 |
| D |   | Yes | 1266 | 2.47 |
| D | 27 | Yes | 1250 | 2.44 |
| D |   | Yes | 1259 | 2.68 |
| D |   | Yes | 1260 | 4.05 |
| D |   | Yes | 1280 | 2.08 |
| D |   | Yes | 1347 | 2.03 |

*Cracking reaction at 1050° F. (566° C.)

EXAMPLE III

Catalyst B was used separately in the combustion of carbon monoxide to carbon dioxide. The combustion of CO to $CO_2$ was studied over the temperature range of 1000° F.–1450° F. A gaseous stream of dry CO from a pressurized bottle was passed through a regulator to control CO effluent pressure to the desired level. The CO stream was then directed to a rotometer and a flow meter. The flow rate of the CO stream was thus adjusted to a desired value of 30 cc/min. The CO was combined with a dry air stream that was likewise pressure regulated procontrolled at a rate of 120 cc/min. The combined air and CO was fed to a reactor. Reactor was a near cylindrical, tubular reactor made of a suitable refractory material. The refractory material used in this example was quartz. The reactor was positioned near vertically and had a feed inlet near its base zone. The reactor was contained within and was heated by an electric furnace. The reactor was charged with particles of a catalyst of this invention, i.e. catalyst B. A thermocouple was placed within the catalyst bed within the reactor and the temperature of the catalyst bed was measured. By heating the reactor containing the catalyst the gaseous stream of CO and air, that was passed through the reactor and the catalyst bed, was combusted. The combustion off gases were passed overhead from the reactor. They were directed to a collecting sphere having an elastic diaphragm and a displaceable volume of water. The volume of off gases was measured by measuring the displacement of water. The concentration of $CO_2$ and CO in the off gas stream was measured by the use of chromatograph which was in communication with the collecting sphere. Off gas samples and data were collected over the temperature range of 1000° F.–1450° F. Table V summarizes pertinent conditions and the results obtained from the combustion of CO to $CO_2$.

The data show that the $CO_2/CO$ ratio from the combustion of CO increases near exponentially from the initial test point of 1000° F. The chromatograph detected no CO at temperatures of 1400° F. and 1450° F. This indicates that the level of CO was below the detection sensitivity of the chromatograph. The data of Table V indicate that at temperatures in excess of 1350° F. near complete combustion of CO to $CO_2$ occurs.

TABLE V

Combustion of CO to $CO_2$ (catalyst B, Mn and Sb)

| Temperature, °F. | $CO_2/CO$ |
|---|---|
| 1000 | 0.854 |
| 1000 | 1.11 |
| 1050 | 1.20 |
| 1100 | 1.55 |
| 1150 | 2.61 |
| 1200 | 3.49 |
| 1220 | 4.88 |
| 1240 | 6.46 |
| 1250 | 9.39 |
| 1260 | 10.76 |
| 1280 | 15.80 |
| 1300 | 26.72 |
| 1350 | 76.89 |
| 1400 | very large |
| 1450 | very large |

Reasonable variations and modifications apparent to one skilled in the art can be made in this invention without departing from the spirit and scope thereof.

That which is claimed is:

1. A process for combusting carbonaceous fuel and a free oxygen containing gas, which process comprises:
    (a) passing into contact with a catalyst said carbonaceous fuel, which is separate from and not adhering to said catalyst and said free oxygen containing gas, said catalyst containing both manganese and antimony,
    (b) subjecting the mixture of said catalyst, said separate carbonaceous fuel and said free oxygen containing gas to combustion conditions,
    (c) withdrawing an off-gas from said mixture having a high $CO_2/CO$ ratio.

2. A process in accordance with claim 1 wherein said fuel is a gaseous carbonaceous material.

3. A process in accordance with claim 2 wherein said fuel is carbon monoxide.

4. Process in accordance with claim 1 wherein said combustion is carried out at a temperature above about 1260° F.

5. Process in accordance with claim 1 wherein said catalyst comprises silica or silica/alumina and contains both manganese and antimony on said silica or respectively silica/alumina.

6. Process in accordance with claim 5 wherein said catalyst comprises a zeolite modified silica or silica/alumina material.

7. A process in accordance with claim 6 wherein said zeolite modified material is rare earth ion exchanged.

8. A process in accordance with claim 1 wherein said catalyst contains manganese and antimony in a weight ratio in the range of 10:1 to 1:10.

9. A combustion process comprising:
    (a) in a first combustion step converting a carbonaceous fuel and free oxygen into an off-gas containing carbon monoxide and carbon dioxide,
    (b) in a second combustion step subjecting said carbon monoxide and carbon dioxide together with free oxygen to combustion conditions in contact with a catalyst containing both manganese and antimony to produce a further off-gas having a substantially higher $CO_2/CO$ ratio than the off-gas from the first combustion step.

10. A process in accordance with claim 9 wherein said catalyst contains the manganese and antimony supported on a silica or silica/alumina base.

11. Process in accordance with claim 10 wherein said silica or silica/alumina base is a zeolite modified material which is rare earth ion exchanged.

12. A process in accordance with claim 9 wherein the catalyst contains manganese and antimony in a weight ratio in the range of 10:1 to 1:10.

13. A process in accordance with claim 9 wherein said second combustion step is carried out at a temperature above 1260° F.

14. A process for combusting a gaseous or normally liquid carbonaceous fuel and a free oxygen containing gas in contact with a catalyst which process comprises:
    (a) passing said carbonaceous fuel which is separate from and not adhering to said catalyst and said free oxygen containing gas into contact with said catalyst, which catalyst contains both manganese and antimony on a silica or silica/alumina base in a quantity of about 0.01 to 8 weight percent of antimony and a quantity of about 0.01 to 8 weight percent of manganese based on the weight of the catalyst and the added metals, the weight ratio of manganese to antimony on the catalyst being in the range of 10:1 to 1:10,
    (b) subjecting the mixture of said catalyst, said separate carbonaceous fuel and said free oxygen containing gas to combustion conditions including a temperature above 1260° F.,
    (c) withdrawing an off-gas from said mixture having a high $CO_2/CO$ ratio.

* * * * *